United States Patent
Wing et al.

(10) Patent No.: US 9,634,908 B2
(45) Date of Patent: Apr. 25, 2017

(54) DETERMINING CHARACTERISTICS OF A CONNECTION TRAVERSING A PACKET SWITCHING DEVICE

(71) Applicants: Daniel G. Wing, San Joe, CA (US); William C. VerSteeg, Buford, GA (US); Reinaldo de Azevedo Penno Filho, San Jose, CA (US)

(72) Inventors: Daniel G. Wing, San Joe, CA (US); William C. VerSteeg, Buford, GA (US); Reinaldo de Azevedo Penno Filho, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 118 days.

(21) Appl. No.: 14/259,565

(22) Filed: Apr. 23, 2014

(65) Prior Publication Data
US 2015/0312106 A1    Oct. 29, 2015

(51) Int. Cl.
*H04L 12/28* (2006.01)
*H04L 12/24* (2006.01)
*H04L 29/12* (2006.01)

(52) U.S. Cl.
CPC .......... *H04L 41/5009* (2013.01); *H04L 41/12* (2013.01); *H04L 61/2514* (2013.01); *H04L 61/2517* (2013.01)

(58) Field of Classification Search
USPC ................................ 370/252, 389, 392, 401
See application file for complete search history.

(56) References Cited

U.S. PATENT DOCUMENTS 7,706,278 B2    4/2010 Wing et al.
7,738,383 B2    6/2010 Wing et al.
(Continued)

OTHER PUBLICATIONS

Wing et al., "Port Control Protocol (PCP)," RFC 6887, Apr. 2013, The Internet Society, Reston, VA (eighty-eight pages).
(Continued)

*Primary Examiner* — Ricky Ngo
*Assistant Examiner* — Christine Ng
(74) *Attorney, Agent, or Firm* — The Law Office of Kirk D. Williams

(57) ABSTRACT

In one embodiment, characteristics of a connection traversing a packet switching device is determined, which includes, but not limited to, determining a network port number and/or address of an established connection based on a signature of the connection. In one embodiment, a packet switching device receives and forwards packets of particular communication between a device and a remote node in a network. The packet switching device maintains information of the particular communication and identification data for use in subsequent identification of said particular communication. In response to receiving a communications information request specifying a signature related to said particular communications, the packet switching device prepares and sends a response, which typically includes matching the signature to said maintained identification data resulting in identification of said information including a characterization of said particular communications, and sending a reply including the characterization of said particular communications.

27 Claims, 5 Drawing Sheets

(56) References Cited

U.S. PATENT DOCUMENTS

| | | | |
|---|---|---|---|
| 8,909,766 B1* | 12/2014 | Hegg | H04L 41/08 |
| | | | 709/224 |
| 2004/0034773 A1* | 2/2004 | Balabine | A63F 13/12 |
| | | | 713/168 |
| 2005/0216954 A1* | 9/2005 | Ramaiah | H04L 63/1458 |
| | | | 726/22 |
| 2010/0250767 A1* | 9/2010 | Barreto | H04L 69/16 |
| | | | 709/231 |
| 2011/0110504 A1* | 5/2011 | Kaal | H04L 65/104 |
| | | | 379/93.02 |
| 2014/0019607 A1* | 1/2014 | Beste | H04L 47/125 |
| | | | 709/223 |

OTHER PUBLICATIONS

Yourtchendo and Wing, "Revealing hosts sharing an IP address using TCP option," draft-wing-nat-reveal-option-03, Dec. 8, 2011, The Internet Society, Reston, VA (ten pages).

* cited by examiner

DETERMINING CHARACTERISTICS OF A CONNECTION TRAVERSING A PACKET SWITCHING DEVICE

TECHNICAL FIELD

The present disclosure relates generally to forwarding packets in a communications network.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

Reliably communicating information in a network is important. Service providers enter into Service Level Agreements (SLA) which set forth certain performance characteristics which must be met. Also, network operators desire to understand the performance of their network.

BRIEF DESCRIPTION OF THE DRAWINGS

The appended claims set forth the features of one or more embodiments with particularity. The embodiment(s), together with its advantages, may be best understood from the following detailed description taken in conjunction with the accompanying drawings of which:

DESCRIPTION OF EXAMPLE EMBODIMENTS

1. Overview

Figure 1:
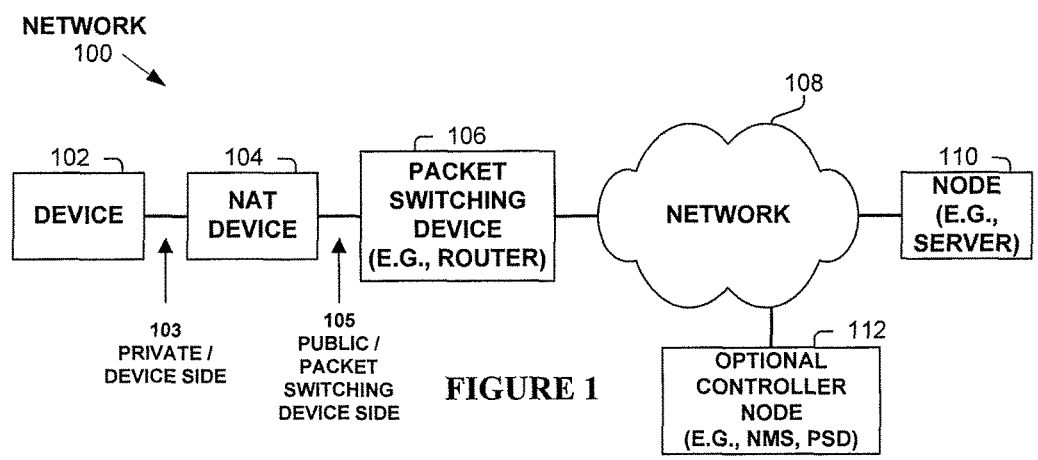
FIG. 1 illustrates a network operating according to one embodiment.

Disclosed are, inter alia, methods, apparatus, computer-storage media, mechanisms, and means associated with determining characteristics of a connection traversing a packet switching device, such as, but not limited to, determining a network port number and/or address of an established connection based on a signature of the connection. When packets traverse a network address translation (NAT) device, the address and port number used is typically translated. To evaluate the performance of a network in regards to translated communication, it is desirous to know the original and translated addresses and port numbers.

One embodiment includes a method, comprising: initiating, by a device, particular communications with a remote node, with said particular communications traversing a packet switching device in a network; subsequent to said initiating said particular communications with the remote node, sending a communications information request from the device specifying a signature related to said communications; and receiving information, by the device, including a characterization of said particular communications responsive to the communications information request.

One embodiment includes a method, comprising: receiving and forwarding, by a particular device, packets of particular communication between a network-coupled device and a remote node in a network; maintaining, by the particular device, information of the particular communication and identification data for use in subsequent identification of said particular communication; receiving a communications information request specifying a signature related to said particular communications; and responding to the communications information request, including matching the signature to said maintained identification data resulting in identification of said information including a characterization of said particular communications, and sending a reply including the characterization of said particular communications.

In one embodiment, the particular device is a network address translation (NAT) device. In one embodiment, the particular device is a router or a switch. In one embodiment, the particular device is a packet switching device and the network includes a network address translation (NAT) device between the network-coupled device and the packet switching device; and wherein the characterization includes an external port number of the device associated with said particular communications used by the packet switching device-side of the NAT device. In one embodiment, prior to said initiating particular communications with the remote node, sending a communications pre-initiation notification message to the particular device identifying that the network-coupled device is about to communicate through the particular device.

2. Description

Disclosed are, inter alia, methods, apparatus, computer-storage media, mechanisms, and means associated with determining characteristics of a connection traversing a packet switching device, such as, but not limited to, determining a network port number and/or address of an established connection based on a signature of the connection. Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc., may comprise one or more embodiments, which may include some elements or limitations of a claim being performed by the same or different systems, devices, components, etc. A processing element may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Computer-readable media and means for performing methods and processing block operations (e.g., a processor and memory or other apparatus configured to perform such operations) are disclosed and are in keeping with the extensible scope of the embodiments. The term "apparatus" is used consistently herein with its common definition of an appliance or device.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value-the value must be obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc., are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC §101 machine statutory class.

Disclosed are, inter alia, methods, apparatus, computer-storage media, mechanisms, and means associated with determining characteristics of a connection traversing a packet switching device, such as, but not limited to, determining a network port number and/or address of an established connection based on a signature of the connection.

One embodiment includes a method, comprising: initiating, by a device, particular communications with a remote node, with said particular communications traversing a packet switching device in a network; subsequent to said initiating said particular communications with the remote node, sending a communications information request from the device specifying a signature related to said communications; and receiving information, by the device, including a characterization of said particular communications responsive to the communications information request.

One embodiment includes a method, comprising: receiving and forwarding, by a particular device, packets of particular communication between a network-coupled device and a remote node in a network; maintaining, by the particular device, information of the particular communication and identification data for use in subsequent identification of said particular communication; receiving a communications information request specifying a signature related to said particular communications; and responding to the communications information request, including matching the signature to said maintained identification data resulting in identification of said information including a characterization of said particular communications, and sending a reply including the characterization of said particular communications.

In one embodiment, the particular device is a network address translation (NAT) device. In one embodiment, the particular device is a router or a switch. In one embodiment, the particular device is a packet switching device and the network includes a network address translation (NAT) device between the network-coupled device and the packet switching device; and wherein the characterization includes an external port number of the device associated with said particular communications used by the packet switching device-side of the NAT device. In one embodiment, prior to said initiating particular communications with the remote node, sending a communications pre-initiation notification message to the particular device identifying that the network-coupled device is about to communicate through the particular device.

FIG. 1 illustrates a network 100 operating according to one embodiment. As shown, device 102 is communicating with node 110. In the illustrated example, the communication traverses NAT device 104 and packet switching device (e.g., router, switch) 106. In one embodiment, device 102 is a computer, set-top box, server, packet switching device, or other device. In one embodiment, node 110 is a server, computer, set-top box, packet switching device, or other device.

As this communication between device 102 and node 110 traverses network address translation (NAT) device 104, the address and port number are translated from the private/device side (103) to the public/packet switching device side (105). Device 102 does not natively know the packet switching device-side (105) address and port number of a communication, though device 102 may know the device-side (103) address and port number. However, verifying compliance with a Service Level Agreement (SLA) and troubleshooting communications problems of a communication often requires the packet switching device-side (105) address and port number of the communication.

Also shown in FIG. 1 is optional controller node 112 (e.g., network management system, operations system, packet switching device). In one embodiment, controller node 112 participates in determining characteristics of a connection traversing a packet switching device, such as, but not limited to, determining a network port number and/or address of an established connection based on a signature of the connection. In other words, one or more of the operations and messages typically illustrated herein (e.g., in FIGS. 2, 4A, 4B) as being performed, sent and/or received by device 102 and/or node 110 may be performed, sent and/or received by controller node 112.

Figure 2:
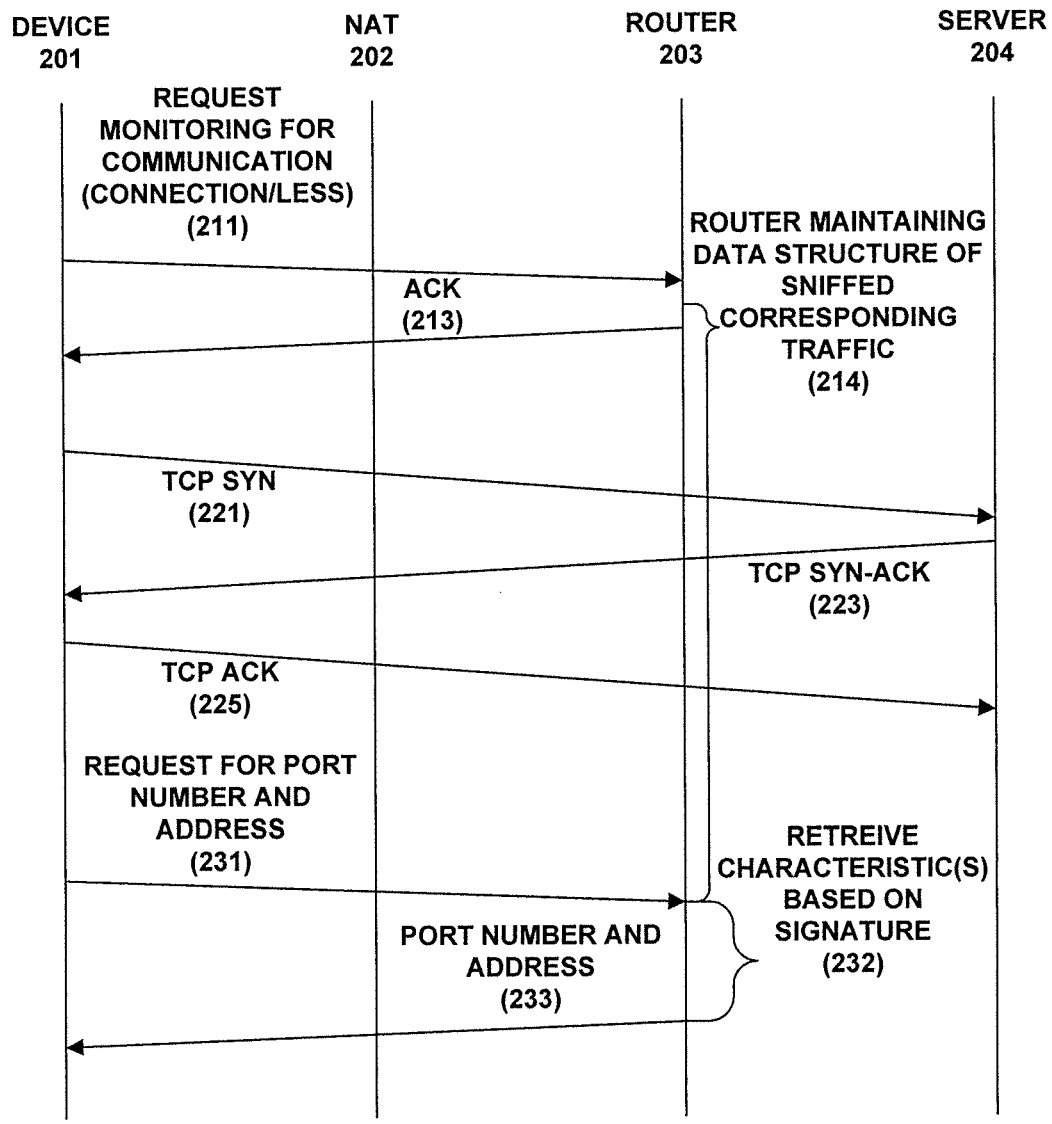
FIG. 2 illustrates a message sequence chart according to one embodiment.

FIG. 2 illustrates messages communicated in one embodiment, such as, but not limited to, in a network including a configuration similar to that illustrated by FIG. 1.

As shown in FIG. 2, device 201 sends (211) a request to router 203 to monitor communications between device 201 and server 204. In one embodiment and prior to sending (211) the request, device 201 determines the address of router 203 using a traceroute to an Internet Protocol (IP) address routable on the Internet, Domain Name System (DNS), Dynamic Host Configuration Protocol (DHCP), sending to its default route, or using another technique. In one embodiment, router 203 is a service provider's packet switching device running Port Control Protocol.

In response to the received request 211, router 203 maintains (214) a data structure of sniffed packet traffic corresponding to the received request (typically specifying a subset of packet traffic for which to monitor). This data structure maintains identification information of the communication as well as one or more characteristics of communication (e.g., packet switching device-side source address and port). Router 203 sends (213) an acknowledgement message to device 201.

Because device 201 does not have the packet switching device-side port number (and also probably not the packet switching device-side address), router 203 typically monitors a larger set of packet traffic than just that of the desired communication. One embodiment limits this larger set of traffic, as request 211 includes a destination address and/or port number, so that router 203 can limit its scope of monitoring accordingly. One embodiment sniffs for Transmission Control Protocol (TCP) connection establishment messages (e.g., SYN, SYN-ACK, ACK) which may further limit the scope of the maintained information. One embodiment tailors the scope of this larger set of packet traffic based on the filtering information included in the received request (211), such as, but not limited to, destination address and/or port, protocol type (e.g., User Datagram Protocol (UDP), TCP, Internet Key Exchange, Datagram Transport Layer Security, Internet Connectively Establishment), and/or portion of the communication (e.g., establishment of a connection).

In the example shown in FIG. 2, device 201 and server 204 establish a TCP connection traversing router 203 using TCP SYN (221), SYN-ACK (223), and ACK (225) messages. Router 203 updates its data structure based on this sniffed information (214). In one embodiment, router 203 maintains identification information unique to the connection between device 201 and server 204. The connection between device 201 and server 204 then can be unambiguously identified by matching this unique information with specified corresponding signature on which to search (e.g., included in request 231), thus allowing retrieval of one or more characteristics (e.g., packet switching device-side port number and/or address) of the connection. In the context of the establishment of a TCP connection, such unique identification information included in an initial few packets of the communication may include the address and port of server 204, one or more sequence numbers included in the header of a packet (221, 223, 225) (e.g., possibly including the initial sequence number of the TCP connection). Other examples of identification information include, but are not limited to, window size, other options (e.g., in a header of the packet of the communication), sequence number, user name, session identification, other attribute(s), etc.

As shown in FIG. 2, device 201 sends (231), and router 203 receives, a request for one or more characteristics (e.g., packet switching device-side port number and/or address) of the communication, with this request typically including a signature corresponding to identification information keying the data structure maintained by router 203. In one embodiment, router 203 ceases further maintaining (e.g., sniffing traffic and updating) the data structure (214). By triggering router (packet switching device) 203 in response to request 211 to start maintaining the data structure based on sniffed packet traffic, router 203 does not need to always be expending resources to monitor traffic for subsequent matching based on a signature.

Router 203 matches the received signature (e.g., values uniquely identifying the communication of interest) to the maintained identification information to identify the communication of interest, and retrieves one or more characteristics of the communication of interest. Router 203 sends (233) information including these retrieved one or more characteristics (e.g., packet switching device-side port number and/or address) to device 201. Device 201 receives these one or more characteristics and uses accordingly. In one embodiment, device 201 is a set-top box. These one or more characteristics can be used to diagnose a particular connection (e.g., video stream).

One embodiment operates similar to that described in relation to FIG. 2, but the intermediate packet switching device 203 (e.g., router, switch) always monitors for new connections and saves state (214) of the monitored traffic. One embodiment does not use pre-initiation request and/or response messages (211, 213). In one embodiment, NAT device 202 performs network address translation of messages, but does not participate in the operations illustrated in the sequence message chart of FIG. 2. In one embodiment, NAT device 202 performs network address translation of messages, and also participates in the operations illustrated in the sequence message chart of FIG. 2 such as, but not limited to, performing some or all of the operations shown as performed by router 203.

Figure 3A:
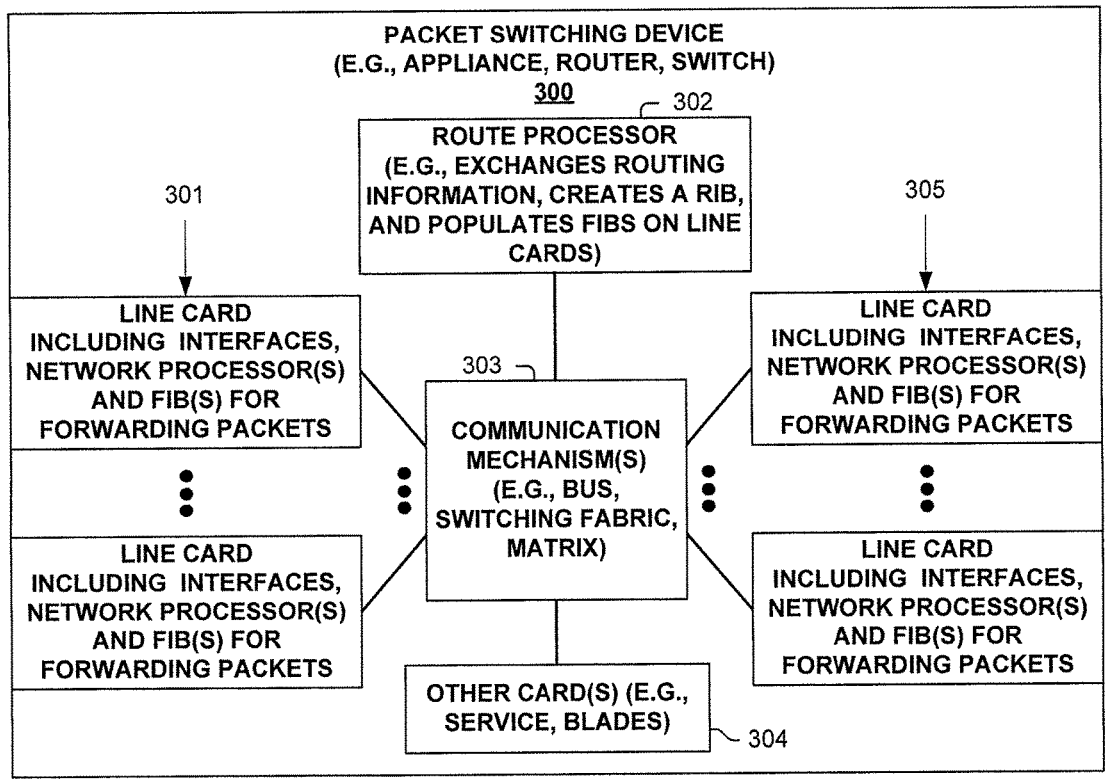
FIG. 3A illustrates a packet switching device according to one embodiment.

One embodiment of a packet switching device 300 is illustrated in FIG. 3A. As shown, packet switching device 300 includes multiple line cards 301 and 305, each with one or more network interfaces for sending and receiving packets over communications links (e.g., possibly part of a link aggregation group), and with one or more processing elements that are used in one embodiment associated with determining characteristics of a connection traversing a packet switching device, such as, but not limited to, determining a network port number and/or address of an established connection based on a signature of the connection. Packet switching device 300 also has a control plane with one or more processing elements 302 for managing the control plane and/or control plane processing of packets associated with determining characteristics of a connection traversing a packet switching device. Packet switching device 300 also includes other cards 304 (e.g., service cards, blades) which include processing elements that are used in one embodiment to process packets associated with determining characteristics of a connection traversing a packet switching device, and some communication mechanism 303 (e.g., bus, switching fabric, matrix) for allowing its different entities 301, 302, 304 and 305 to communicate.

Line cards 301 and 305 typically perform the actions of being both an ingress and egress line card, in regards to multiple other particular packets and/or packet streams being received by, or sent from, packet switching device 300. In one embodiment, line cards 301 and/or 305 record information for timeframe groups of packets. Packets of a timeframe group of packets may be sent and/or received on different line cards, interfaces, ports, etc. Each of these different entities typically records information related to each timeframe group of packets, with this distributed collected information being consolidated to acquire aggregate information for the timeframe groups of packets.

Figure 3B:
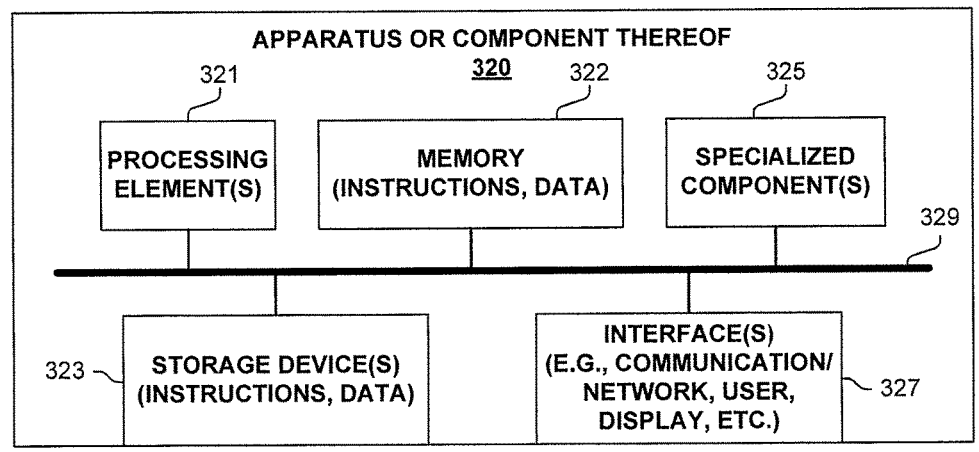
FIG. 3B illustrates an apparatus according to one embodiment.

FIG. 3B is a block diagram of an apparatus 320 used in one embodiment associated with determining characteristics of a connection traversing a packet switching device, such as, but not limited to, determining a network port number and/or address of an established connection based on a signature of the connection. In one embodiment, apparatus 320 performs one or more processes (which may include synchronization processing), or portions thereof, corresponding to one of the flow diagrams illustrated or otherwise described herein, and/or illustrated in another diagram or otherwise described herein.

In one embodiment, apparatus 320 includes one or more processing element(s) 321, memory 322, storage device(s) 323, specialized component(s) 325 (e.g. optimized hardware such as for performing lookup and/or packet processing operations, etc.), and interface(s) 327 for communicating information (e.g., sending and receiving packets, user-interfaces, displaying information, etc.), which are typically communicatively coupled via one or more communications mechanisms 329, with the communications paths typically tailored to meet the needs of a particular application.

Various embodiments of apparatus 320 may include more or fewer elements. The operation of apparatus 320 is typically controlled by processing element(s) 321 using memory 322 and storage device(s) 323 to perform one or more tasks or processes. Memory 322 is one type of computer-readable/computer-storage medium, and typically comprises random access memory (RAM), read only memory (ROM), flash memory, integrated circuits, and/or other memory components. Memory 322 typically stores computer-executable instructions to be executed by processing element(s) 321 and/or data which is manipulated by processing element(s) 321 for implementing functionality in accordance with an embodiment. Storage device(s) 323 are another type of computer-readable medium, and typically comprise solid state storage media, disk drives, diskettes, networked services, tape drives, and other storage devices. Storage device(s) 323 typically store computer-executable instructions to be executed by processing element(s) 321 and/or data which is manipulated by processing element(s) 321 for implementing functionality in accordance with an embodiment.

Figure 4A:
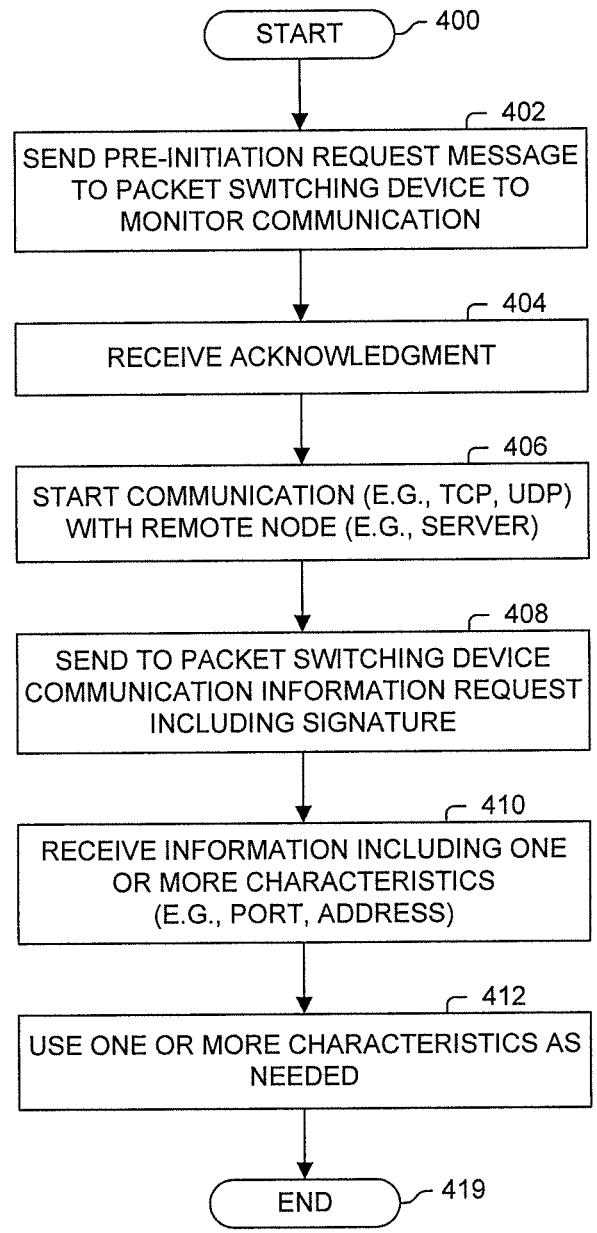
FIG. 4A illustrates a process according to one embodiment.

FIG. 4A illustrates a process performed in one embodiment by a device. Processing begins with process block 400. In process block 402, a pre-initiation request message is sent to the packet switching device to cause the packet switching device to monitor for a communication about to commence. In process block 404, an acknowledgment message is received. In process block 406, the communication with the remote node is commenced. In process block 408, a communication information request message, including a signature of the communication, is sent to the packet switching device. In process block 410, the device receives information. The received information, includes one or more characteristics (e.g., packet switching device-side port number and/or address). In process block 412, the device uses these characteristic(s) as needed (e.g., for operations and/or network management purposes). Processing of the flow diagram of FIG. 4A is complete as indicated by process block 419.

Figure 4B:
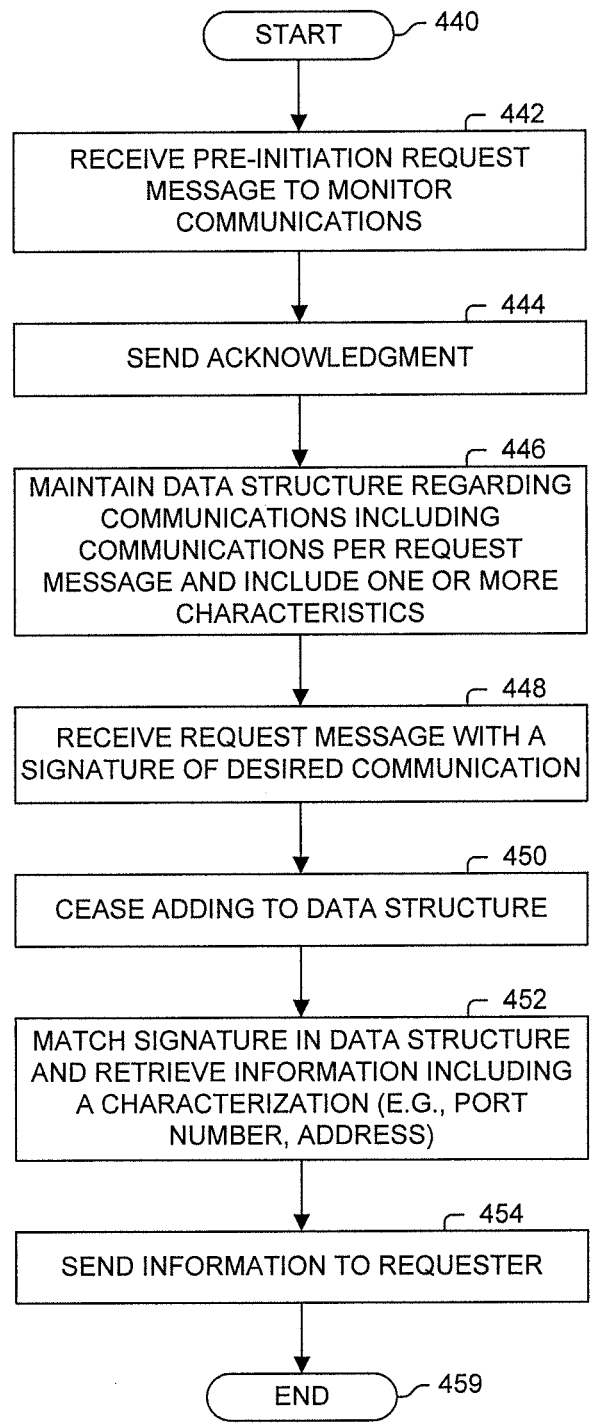
FIG. 4B illustrates a process according to one embodiment.

FIG. 4B illustrates a process performed in one embodiment by a packet switching device. Processing begins with process block 440. In process block 442, a pre-initiation request message is received to request the packet switching device monitors communications, at least to a particular destination (to narrow the scope of information collected). In process block 444, the packet switching devices sends an acknowledgement message. In process block 446, the packet switching device maintains a data structure regarding communications (including those requested in the received message), which includes storing identification information and one or more characteristics. In process block 448, the packet switching device receives a request message specifying a signature of the desired communication. In process block 450, the packet switching device ceases maintaining the data structure (e.g., stop sniffing and updating the data structure). In process block 452, the packet switching device matches the signature to identification information in the data structure to retrieve information including one or more characteristics (e.g., packet switching device-side port number and/or address). In process block 454, the packet switching device sends this information to the requester (e.g., device, network management system). Processing of the flow diagram of FIG. 4B is complete as indicated by process block 459.

One embodiment operates similar to that described in relation to FIGS. 4A-B, but the intermediate packet switching device (e.g., router, switch) always monitors for new connections and saves state. Hence, the ceasing operation of process block 450 of FIG. 4B is not performed in one embodiment. Also, one embodiment does not use pre-initiation request and/or response messages such as described in relation to process blocks 402 and 404 of FIG. 4A and process blocks 442 and 444 of FIG. 4B.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method, comprising:
    initiating, by a device, particular Internet Protocol Transport Control Protocol (TCP) or User Datagram Protocol (UDP) communications with a remote node, with said particular communications traversing a packet switching device in a network and traversing a network address translation (NAT) device between the device and the packet switching device, with the NAT device translating a private-side address of the device to a packet switching device-side address of the device;
    subsequent to said initiating said particular communications with the remote node, sending a communications information request from the device specifying a signature related to said communications with the signature not including the packet switching device-side address; and
    receiving information, by the device, including a characterization of said particular communications responsive to the communications information request, with the characterization including the packet switching device-side address.

2. The method of claim 1, wherein the characterization includes an external port number of the device associated with said particular communications used by the packet switching device-side of the NAT device.

3. The method of claim 2, comprising prior to said initiating particular communications with the remote node, sending a communications pre-initiation notification message to the packet switching device identifying that the device is about to communicate through the packet switching device.

4. The method of claim 3, comprising in response to receiving a pre-initiation response message identifying that the packet switching device is monitoring for communications, performing said initiating particular communications.

5. The method of claim 3, wherein said initiating said particular communications includes initiating the establishment of a Transport Control Protocol (TCP) connection; and wherein the signature includes a sequence number included in the SYN, SYN-ACK or ACK packet used in said establishment of the TCP connection.

6. The method of claim 2, wherein said initiating said particular communications includes initiating the establishment of a Transport Control Protocol (TCP) connection; and wherein the signature includes an initial sequence number of the TCP connection.

7. The method of claim 2, wherein said initiating said particular communications includes initiating the establishment of a Transport Control Protocol (TCP) connection; and wherein the signature includes a sequence number included in the SYN, SYN-ACK or ACK packet used in said establishment of the TCP connection.

8. The method of claim 2, wherein said initiating said communications includes using User Datagram Protocol (UDP).

9. The method of claim 1, wherein the communications information request is sent from the device to the packet switching device, and the device receives the characterization in a message sent from the packet switching device to the device.

10. The method of claim 1, wherein the signature includes a unique value that is in at least one of the initial few packets of said particular communications.

11. The method of claim 1, comprising prior to said initiating particular communications with the remote node, sending a communications pre-initiation notification message to the packet switching device identifying that the device is about to communicate through the packet switching device.

12. The method of claim 1, wherein the characterization includes an external Internet Protocol (IP) address of the device associated with said particular communications used by the packet switching device-side of the NAT device.

13. A method, comprising:
receiving and forwarding, by a particular device, packets of particular Internet Protocol Transport Control Protocol (TCP) or User Datagram Protocol (UDP) communications between a network-coupled device and a remote node in a network, with the particular device is a packet switching device, and with the network including a network address translation (NAT) device between the network-coupled device and the particular device, with the NAT device translating a private-side address of the network-coupled device to a packet switching device-side address of the network-coupled device;
maintaining, by the particular device, information of the particular communications and identification data for use in subsequent identification of said particular communications;
receiving a communications information request specifying a signature related to said particular communications, with the signature not including the packet switching device-side address; and
responding to the communications information request, including matching the signature to said maintained identification data resulting in identification of said information including a characterization of said particular communications, and sending a reply including the characterization of said particular communications, with the characterization including the packet switching device-side address.

14. The method of claim 13, wherein the characterization includes an external port number of the network-coupled device associated with said particular communications used by the packet switching device-side of the NAT device.

15. The method of claim 14, comprising prior to said receiving and forwarding packets of particular communication, receiving a communications pre-initiation notification message identifying that the network-coupled device is about to communicate through the packet switching device, and in response, monitoring communication at least between the network-coupled device and the remote node.

16. The method of claim 14, wherein said packets of the particular communication include Transport Control Protocol (TCP) SYN, SYN-ACK or ACK packets establishing a TCP connection; and wherein the signature includes a sequence number included in the SYN, SYN-ACK or ACK packet.

17. The method of claim 15, comprising:
initiating, by the network-coupled device (201), said particular communications with the remote node (204), with said particular communications traversing the particular device (203) in the network;
subsequent to said initiating said particular communications with the remote node (204), sending the communications information request from the network-coupled device (201) specifying the signature related to said particular communications;
receiving information in the reply, by the network-coupled device (201), including the characterization of said particular communications responsive to the communications information request;
prior to said initiating particular communications with the remote node (204), the network-coupled device (201) sending the communications pre-initiation notification message to the particular device (203) identifying that the network-coupled device (201) is about to communicate through the particular device (203); and
in response to receiving a pre-initiation response message identifying that the particular device (203) is monitoring for communications, performing said initiating particular communications.

18. The method of claim 17, wherein said initiating said particular communications includes initiating the establishment of a Transport Control Protocol (TCP) connection; and wherein the signature includes an initial sequence number of the TCP connection.

19. The method of claim 17, wherein said initiating said particular communications includes initiating the establishment of a Transport Control Protocol (TCP) connection; and wherein the signature includes a sequence number included in the SYN, SYN-ACK or ACK packet used in said establishment of the TCP connection.

20. The method of claim 17, wherein said initiating said communications includes using User Datagram Protocol (UDP).

21. The method of claim 17, wherein the communications information request is sent from the network-coupled device (201) to the particular device (203), and the network-coupled device (201) receives the characterization in a message sent from the particular device (203) to the network-coupled device (201).

22. The method of claim 17, wherein the signature includes a unique value that is at least one of the initial few packets of said particular communications.

23. The method of claim 17, wherein the characterization includes an external Internet Protocol (IP) address of the network-coupled device (201) associated with said particular communications used by the particular device-side (201) of the NAT device (202).

24. The method of claim 13, comprising prior to said receiving and forwarding packets of particular communication, receiving a communications pre-initiation notification message identifying that the network-coupled device is about to communicate through the particular device, and in response, monitoring communication at least between the network-coupled device and the remote node.

25. The method of claim 13, wherein the signature includes a unique value that is at least one of the initial few packets of said particular communications.

26. A packet switching device, comprising:
one or more processing elements;
memory;
a plurality of interfaces configured for sending and receiving packets; and
one or more packet switching mechanisms configured to packet switch packets among said interfaces;
wherein packet switching device is configured to perform operations, including
receiving and forwarding packets of particular Internet Protocol Transport Control Protocol (TCP) or User Datagram Protocol (UDP) communications between a device and a remote node in a network, with the particular device is a packet switching device, and with the network including a network address translation (NAT) device between the network-coupled device and the particular device, with the NAT device translating a private-side address of the network-coupled device to a packet switching device-side address of the network-coupled device;
maintaining information of the particular communications and identification data for use in subsequent identification of said particular communications;
receiving a communications information request specifying a signature related to said particular communications, with the signature not including the packet switching device-side address; and
responding to the communications information request, including matching the signature to said maintained identification data resulting in identification of said information including a characterization of said particular communications, and sending a reply including the characterization of said particular communications, with the characterization including the packet switching device-side address.

27. The packet switching device of claim 26, wherein the characterization includes an external port number of the device associated with said particular communications used by the packet switching device-side of the NAT device.

\* \* \* \* \*